United States Patent
Lechien

(10) Patent No.: US 10,675,717 B2
(45) Date of Patent: Jun. 9, 2020

(54) PRESINTERED BRAZING

(71) Applicant: Metaldyne, LLC, Plymouth, MI (US)

(72) Inventor: Jeff Lechien, Wilcox, PA (US)

(73) Assignee: Metaldyne, LLC, Plymouth, MI (US)

( * ) Notice: Subject to any disclaimer, the term of this patent is extended or adjusted under 35 U.S.C. 154(b) by 214 days.

(21) Appl. No.: 15/523,693

(22) PCT Filed: Nov. 23, 2015

(86) PCT No.: PCT/US2015/062161
§ 371 (c)(1),
(2) Date: May 2, 2017

(87) PCT Pub. No.: WO2016/081936
PCT Pub. Date: May 26, 2016

(65) Prior Publication Data
US 2018/0304414 A1 Oct. 25, 2018

(51) Int. Cl.
*B23K 35/30* (2006.01)
*B23K 35/24* (2006.01)
(Continued)

(52) U.S. Cl.
CPC ............ *B23K 35/24* (2013.01); *B22F 3/1021* (2013.01); *B22F 7/064* (2013.01);
(Continued)

(58) Field of Classification Search
CPC ...... B22F 3/1021; B22F 7/064; B23K 35/302; B23K 35/306; B23K 35/3066; B23K 35/3073; B23K 35/3086; B23K 35/36
See application file for complete search history.

(56) References Cited

U.S. PATENT DOCUMENTS 2,694,126 A 11/1954 Binstock
3,524,774 A * 8/1970 Volker ................... B23K 35/26
148/22
(Continued)

FOREIGN PATENT DOCUMENTS

CN 1994646 7/2007
JP 2011056533 3/2011
WO 0175348 A1 10/2001

OTHER PUBLICATIONS

Patent Cooperation Treaty (PCT), International Search Report and Written Opinion for Application PCT/US2015/062161 filed Nov. 23, 2015 dated May 23, 2016 International Searching Authority, US.
(Continued)

*Primary Examiner* — Daniel J Wiley
(74) *Attorney, Agent, or Firm* — McDonald Hopkins LLC

(57) ABSTRACT

The present application describes an article having a first metal component joined to a second metal component by a metallurgic joint of presintered powdered metal interposed between contiguous surfaces of the first metal component and the second metal component. The present application also describes a composition for use in a brazing process comprising a presintered powdered metal. The present application also describes a process for brazing including the following steps: presintering a powdered metal; adding the presintered powdered metal to a first and second metal component; and heating the combination of the first and second metal components containing the presintered powdered metal until the powdered metal melts and joins the metal components to form a metallurgic joint.

16 Claims, 4 Drawing Sheets

(51) Int. Cl.
  *B23K 35/02* (2006.01)
  *B23K 35/36* (2006.01)
  *B22F 7/06* (2006.01)
  *B22F 3/10* (2006.01)

(52) U.S. Cl.
  CPC ...... *B23K 35/0222* (2013.01); *B23K 35/0244* (2013.01); *B23K 35/30* (2013.01); *B23K 35/302* (2013.01); *B23K 35/306* (2013.01); *B23K 35/308* (2013.01); *B23K 35/3053* (2013.01); *B23K 35/3066* (2013.01); *B23K 35/3073* (2013.01); *B23K 35/3086* (2013.01); *B23K 35/36* (2013.01); *B22F 2998/10* (2013.01); *B22F 2999/00* (2013.01)

(56) References Cited

U.S. PATENT DOCUMENTS

| | | |
|---|---|---|
| 4,029,476 A | 6/1977 | Knopp |
| 5,156,321 A | 10/1992 | Liburdi et al. |
| 8,815,983 B2 * | 8/2014 | Gerk .................. B22F 1/02 523/210 |
| 2003/0062396 A1 | 4/2003 | Kovacich |
| 2007/0284410 A1 | 12/2007 | Budinger |
| 2009/0041611 A1 | 2/2009 | Sathian et al. |
| 2011/0180199 A1 | 7/2011 | Huxol et al. |
| 2012/0148440 A1 | 6/2012 | Itoh et al. |
| 2014/0037986 A1 | 2/2014 | Weinstein et al. |

OTHER PUBLICATIONS

Gonene et al. "The Effect of Zinc Stearate on Thermal Degradation of Paraffin Wax." Thermal Analysis and Colorimetry. vol. 94 No. 3, 2008, p. 737.

Office Action in connection with Patent Application No. 2017-525361, dated Jul. 23, 2019; 14 pages.

* cited by examiner

Section Y-Y

PRESINTERED BRAZING

CROSS REFERENCE TO RELATED APPLICATIONS

This application claims priority to International Application No. PCT/US2015/062161 entitled "PRESINTERED BRAZING", filed on Nov. 23, 2015, which claims priority to U.S. Provisional Application No. 62/082,736 entitled, PRESINTERED BRAZING, filed on Nov. 21, 2014, each of which is hereby incorporated by reference in its entirety.

FIELD OF USE

The present invention relates to the process of joining components by brazing, and more particularly to an improved method and device for brazing powder metal in an $H_2$—$N_2$ atmosphere.

BACKGROUND

Powder metal components commonly are brazed using in specialized atmospheres. Brazing may occur after or during the sintering process. Brazing may require exceedingly high temperatures that may cause unwanted oxidization of the metals. In order to avoid such oxidization, use of atmospheres other than air may be required.

Brazing atmospheres commonly require a reducing potential that is stronger than what may be reached with a standard $H_2$—$N_2$ atmosphere. Typically, this may be accomplished by the use of endothermic gases, methane or $CO/CO_2$, or dosing within the system. However, such methods have drawbacks.

Adding in additional steps and compositions complicates the brazing process and creates additional opportunities for error. Further, the added components increase manufacturing costs as well as waste and scrap. Therefore, an improved system and method is needed.

SUMMARY

The present application describes an article having a first metal component joined to a second metal component by a metallurgic joint of presintered powdered metal interposed between contiguous surfaces of the first metal component and the second metal component. The powdered metal may be selected from iron, carbon, copper, nickel, molybdenum, chromium, manganese, or a combination of two of more thereof. Further, the powdered metal may be manufactured by a copper infiltration process.

The powdered metal may be presintered in an atmosphere consisting of air, hydrogen, nitrogen, helium, methane, endogas, or a combination of two or more thereof. Additionally, the powdered metal may be presintered at a temperature of about 300° F.-1500° F. In an embodiment, the powdered metal does not contain lubricants. In an embodiment, the powdered metal does not contain fluxing agents.

In an embodiment, the metallurgic joint of the article is formed by a brazing process. The brazing process may occur in a $H_2$—$N_2$ atmosphere.

The break strength of the metallurgic joint may be at least 35000 kN, at least 45000 kN, or even at least 55000 kN.

The present application also describes a composition for use in a brazing process comprising a presintered powdered metal. The present application also describes a process for brazing including the following steps: presintering a powdered metal; adding the presintered powdered metal to a first and second metal component; and heating the combination of the first and second metal components containing the presintered powdered metal until the powdered metal melts and joins the metal components to form a metallurgic joint.

BRIEF DESCRIPTION OF THE DRAWINGS

The operation of the technology may be better understood by reference to the detailed description taken in connection with the following illustrations, wherein.

DETAILED DESCRIPTION

Reference will now be made in detail to exemplary embodiments of the present application, examples of which are illustrated in the accompanying drawings. It is to be understood that other embodiments may be utilized and structural and functional changes may be made without departing from the respective scope of the application. Moreover, features of the various embodiments may be combined or altered without departing from the scope of the application. As such, the following description is presented by way of illustration only and should not limit in any way the various alternatives and modifications that may be made to the illustrated embodiments and still be within the spirit and scope of the application.

A method for presintered brazing is generally presented. Unlike presently known and utilized methods, the presintered brazing method alleviates the need for additional steps and additives to be used during the brazing process. Typical brazing processes require the conventional $H_2$—$N_2$ atmosphere to be altered through additives, such as endothermic gasses and methane dosing. The presintered brazing method presented allows brazing without such atmospheric alterations.

Brazing processes typically are used to join metal components by using a filler metal as a medium. The filler is heated above its melting point and distributed between the metal components.

Commonly, braze pellets are used as the joining medium in a brazing process. Braze pellets may be formed out of any appropriate material, such as powder metal that is pressed into pellet form. Examples of suitable powder metals include, but are not limited to, brass, bronze, alloys of combinations of copper, tin, manganese, silicon, and other common metals. The braze pellets may further contain additives, such as molding lubricants and flux material. The lubricant and flux material may be contained within the powder metal and formed into a pellet. Examples of suitable lubricants and flux materials include, but are not limited to, borax, chlorides, fluorides, phosphates, waxes, stearates, and metal stearates.

Figure 1:
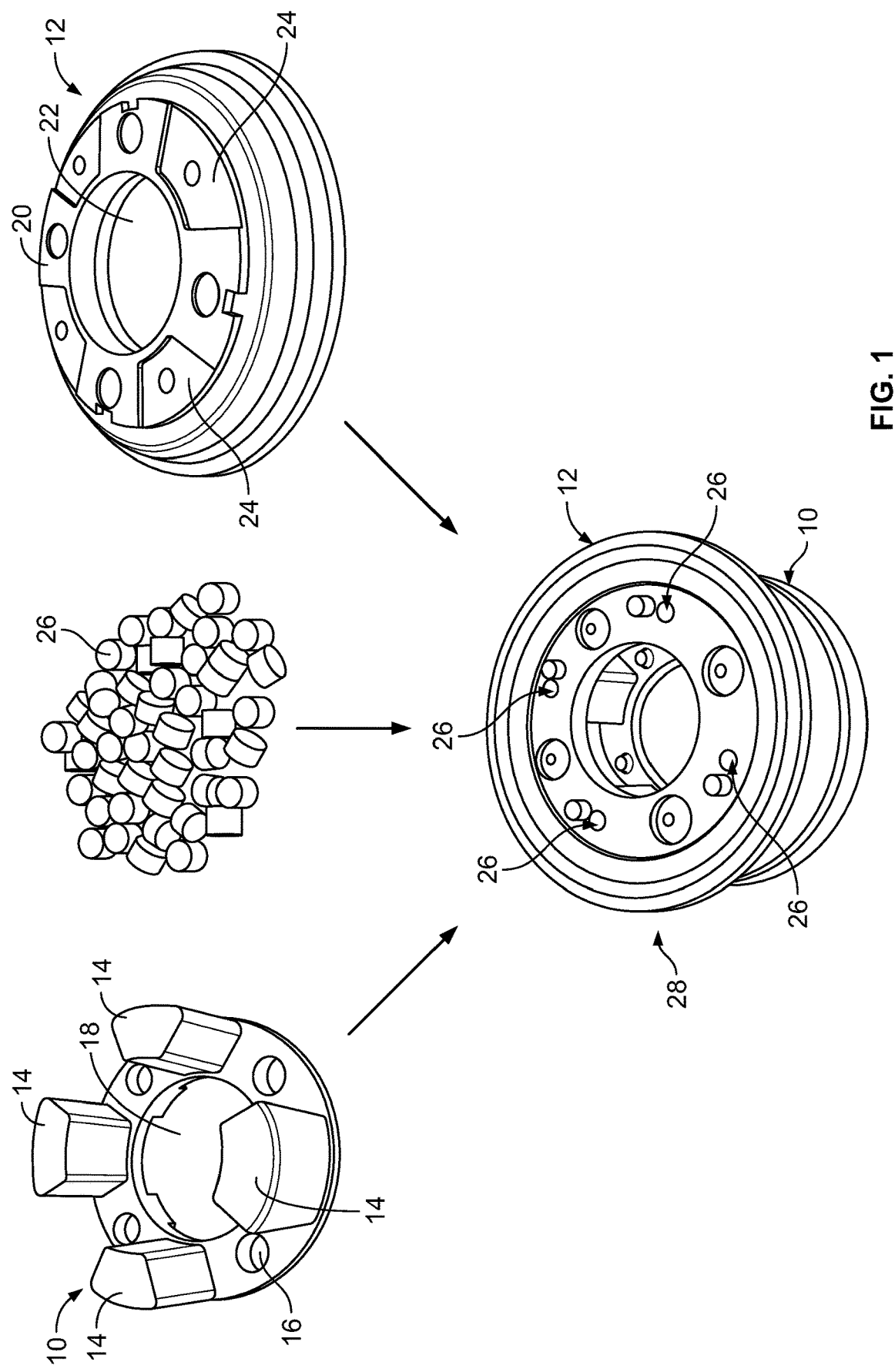
FIG. 1 illustrates metal components and braze pellets prior to brazing and after brazing.

FIG. 1 illustrates components used in a brazing process. A first metal component, a spider 10, and second metal component, a flange 12, are shown. The spider 10 and the flange 12 may be formed of any appropriate metal, including, but not limited to, steel and other alloys. The spider 10 may include one or more arms 14 secured to a generally planar base 16. The base 16 may be generally circular as shown in FIG. 1, or it may be any other appropriate shape, including, but not limited to, square, rectangular, ovoid, pentagonal, hexagonal, etc. The present teachings are not limited to the shapes described herein. Any shaped base 16 may be utilized. In some embodiments, the planar base 16 of the spider 10 may have a central aperture 18 and one or more arms 14 extending outwardly from the planar base 16. The arms 14 can be any appropriate shape, including, but not limited to, round, cuboid, cylindrical, circular, etc. Further, the arms 14 may terminate in any desired shape, including, but not limited to, enlarged lobes, blunt ends, tapered ends, rounded distal ends, T-shaped distal ends, Y-shaped distal ends, etc. The number of arms 14 in the spider 10 may vary, e.g., one through six or more. The arms 14 may be spaced evenly around the edge of the planar base 16 or there may be varying distances between different arms 14. The spacing between the arms 14 may allow for the movement of fluids and solid materials.

The flange 12 may be generally circular in shape as shown in FIG. 1 or it may be any other appropriate shape, including, but not limited to, square, rectangular, ovoid, pentagonal, hexagonal, etc. The present teachings are not limited by shape, any appropriate shape may be utilized. The flange 12 may have a top side 20 and an underside (not shown). The flange 12 may have a generally convex shape, a generally planar shape, or a generally concave shape and may be configured to receive and/or contact the arms 14 of the spider 10 with its underside. The flange 12 may include a central aperture 22 and openings 24 designed to receive pellets 26 on the top side 20 surrounding the central aperture 22.

The spider 10 and flange 12 may be combined to form a carrier part 28 for an automobile transmission. In an embodiment, the flange 12 may be placed atop the spider 10 such that the arms 14 of the spider 10 match up with the openings 24 of the flange 12. This positioning will allow for the braze pellets 26 to contact both the spider 10 and the flange 12. While the spider 10 and the flange 12 are discussed in this application, it should be appreciated that the brazing process described herein may be used and applied to any type of metal components.

FIG. 1 further illustrates braze pellets 26. The braze pellets 26 may be formed out of powder metal, lubricants, and flux material. Examples of suitable powder metals and alloys include, but are not limited to, iron, carbon, copper, nickel, molybdenum, chromium, manganese, silicon, boron, and combinations of two or more thereof. In an embodiment, the pellets 26 may include alloys constructed with the use of a copper infiltration process. Examples of suitable lubricants and flux materials include, but are not limited to, borax, chlorides, fluorides, phosphates, amide waxes, or metallic stearates. In some embodiments, the pellets 26 do not include any lubricants. In some embodiments, the pellets 26 do not include any flux materials. In some embodiments, the pellets 26 do not include any lubricants or flux materials.

The braze pellets 16 may be formed into any appropriate pellet shape and size, including, but not limited to, circular, cuboid, cylindrical, etc. The braze pellets 26 may be formed into any appropriate size pellet including, but not limited to, 3-10 mm planar dimension or a diameter of 0-10 mm long. The braze pellets 26 may be selected from any commercially available braze powders or preformed braze alloy articles that include pressing lubricants such as amide waxes, metallic stearates, and other proprietary lubricants and/or fluxing agents. Examples of these commercially available braze powders and preformed braze alloy articles include ANCORBRAZE 72 from Hoeganaes Corporation.

In a first step of the process, i.e., the presintering step, the braze pellets 26 may be thermally treated to remove the lubricant from the braze alloy. This may be accomplished through specific heating of the pellets 26 to a desired temperature that melts and/or evaporates the lubricant material from the pellets 26. In an embodiment, the desired temperature may be about 300° F.-1500° F.; between about 400° F.-1400° F.; between about 500° F.-1300° F.; between about 600° F.-1200° F.; between about 700° F.-1100° F.; between about 800° F.-1000° F.; and even between about 850° F.-950° F. In an embodiment, the thermal treatment temperature may be between about 1200° F. and 1900° F. However, it should be appreciated that any appropriate temperature necessary to remove the lubrication materials from the braze alloy of the pellet 18 may be used.

The presintering process may take place in a furnace, an oven, a laboratory, or any other appropriate environment. The presintering environment may incorporate any appropriate atmosphere, including, but not limited to air, hydrogen, nitrogen, helium, methane, endogas, or a combination of two or more thereof.

Once the lubrication material has been removed from the braze alloy of the pellet 18, the braze pellets 26 may be used in the brazing process. For the first step in the brazing process, the flange 12 may be placed atop the spider 10 such that the arms 14 of the spider 10 match up with the openings 24 of the flange 12. As shown in FIG. 1, the pellets 26 may be placed within openings 17 in the flange 12. The openings 17 may be specifically designed to allow the pellets and the braze alloy to contact both the spider 10 and the flange 12.

Once the braze pellets 26 have been positioned into the appropriate openings 17, the metal components may be placed into a furnace. Because brazing requires exceptionally high temperatures that may cause oxidization, the furnace may utilize an atmospheres other than air. For example, the furnace may use any combination of $H_2$—$N_2$, He, and/or Ar atmospheres to avoid oxidization.

Unlike current brazing processes that benefit from the use of endothermic gases, such as methane or $CO/CO_2$, or dosing within the system, such additives are not necessary. The furnace may utilize an $H_2$—$N_2$ atmosphere without any endothermic gas additives or methane dosing. The $H_2$—$N_2$ atmosphere is sufficient to provide acceptable wetting and brazed interface strength after the pre-thermal treatment of the braze pellets, without any added endothermic gasses or methane dosing.

Figure 2A:
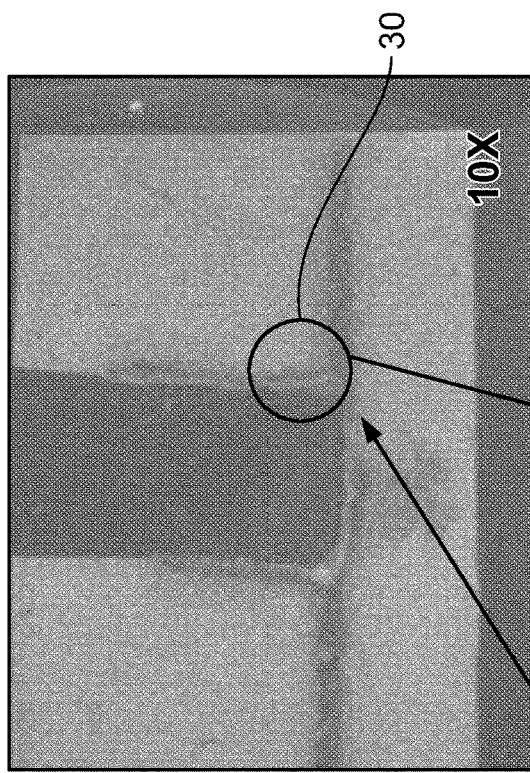
FIGS. 2A-2D illustrate various magnified views of braze pellets within metal components after the pellets have melted and alloyed with the metal components being joined.
Figure 2C:
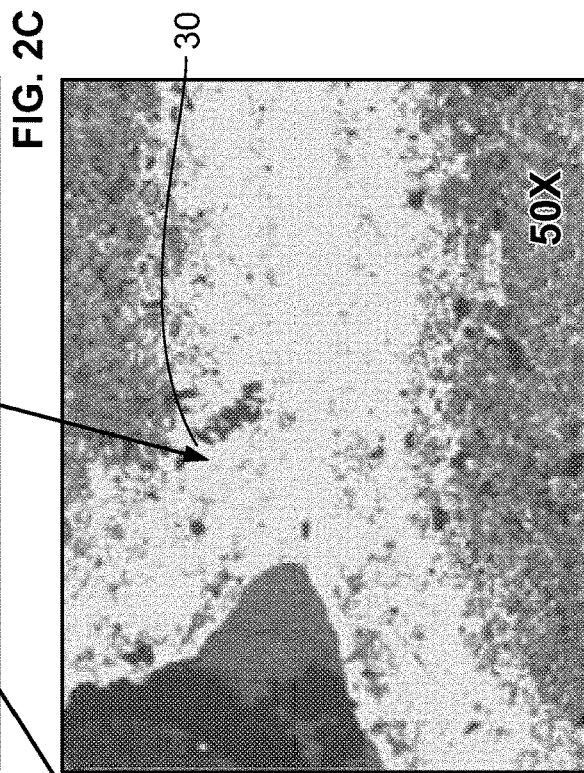
Figure 2B:
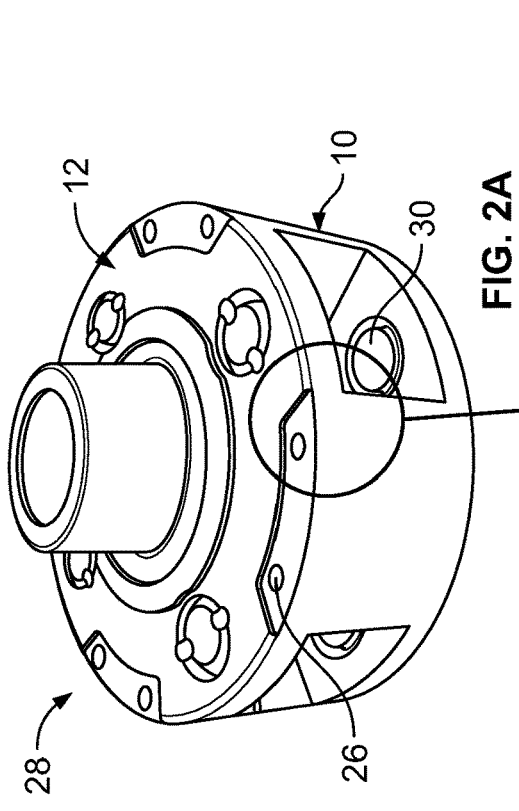
Figure 2D:
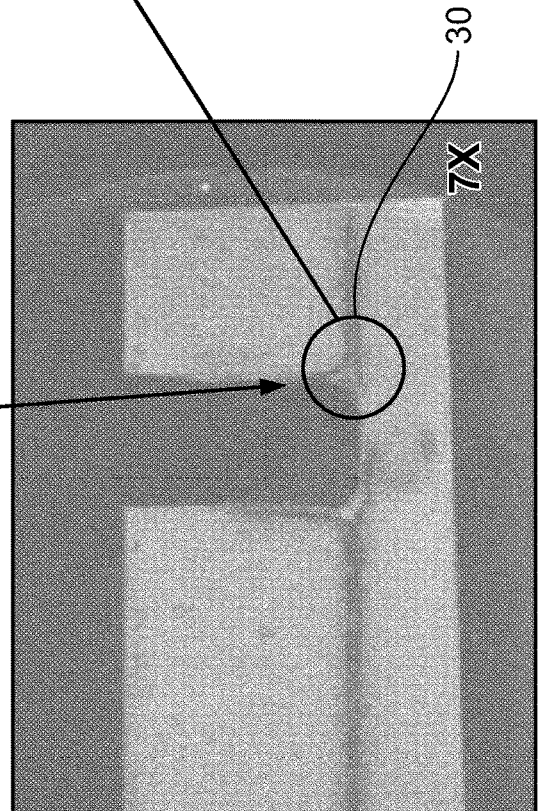
Figure 3A:
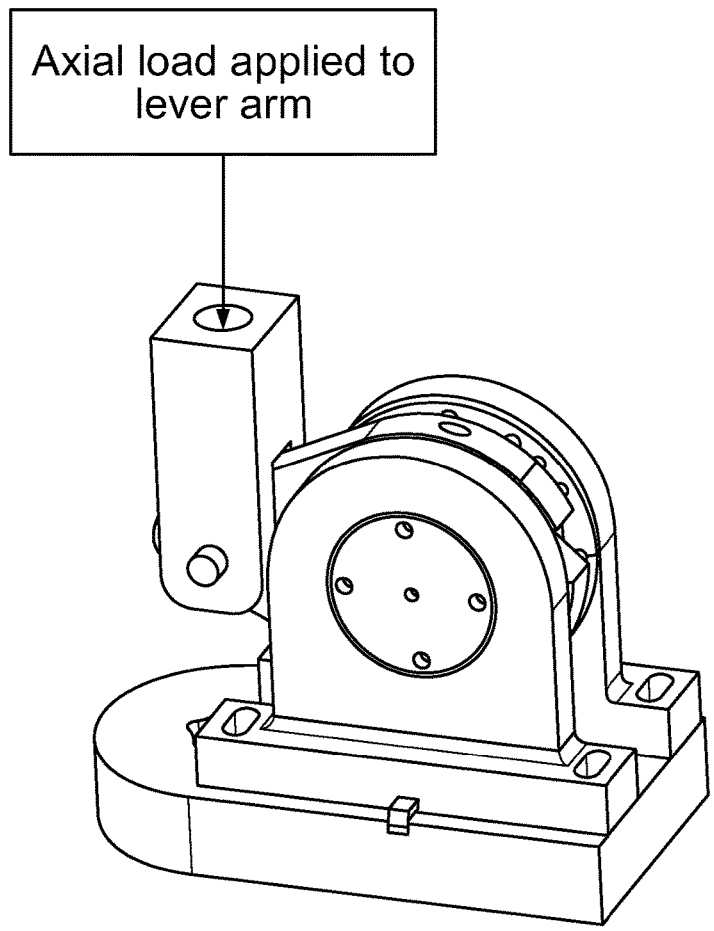
FIGS. 3A-3B illustrate various torque test fixtures.
Figure 3B:
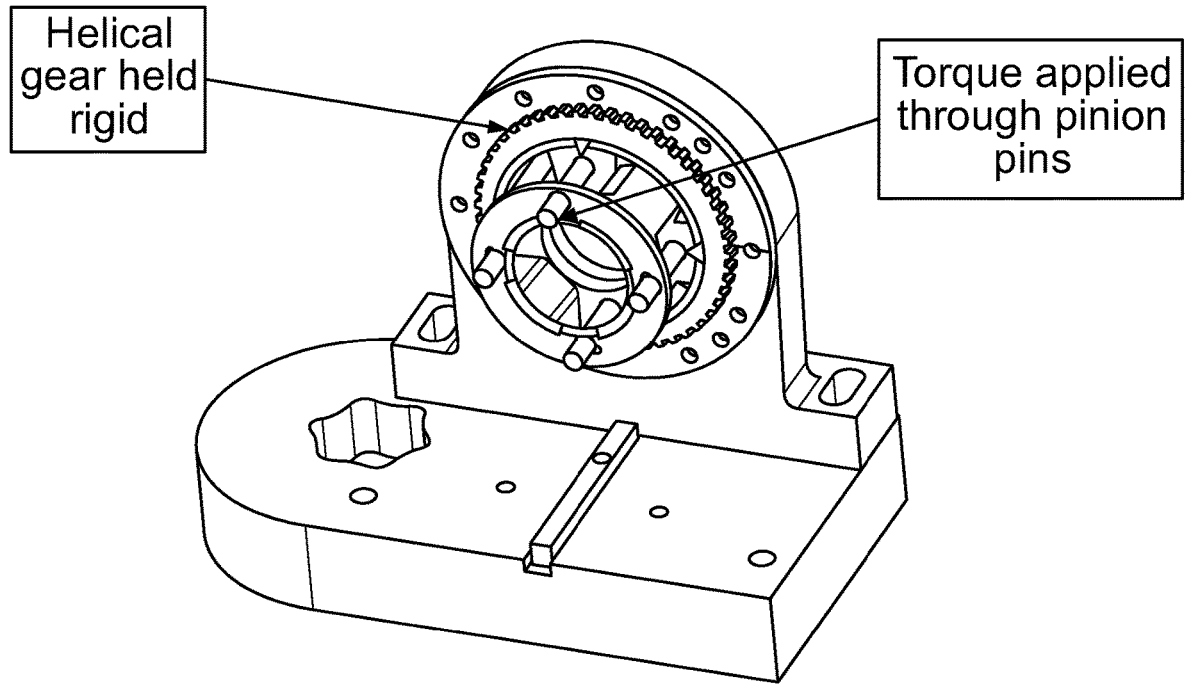
Figure 4C:
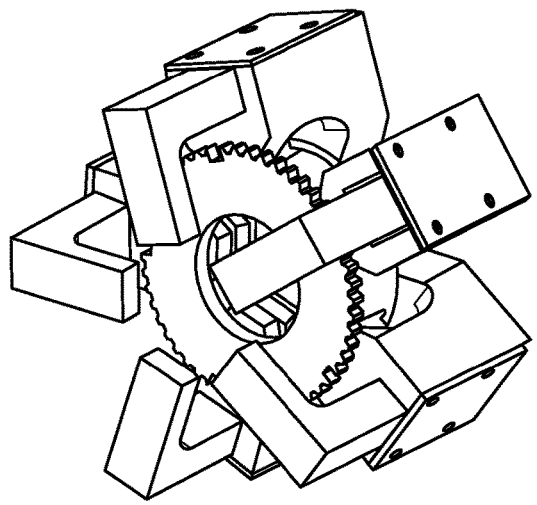
FIGS. 4A-4D illustrate various tensile test fixtures.
Figure 4D:
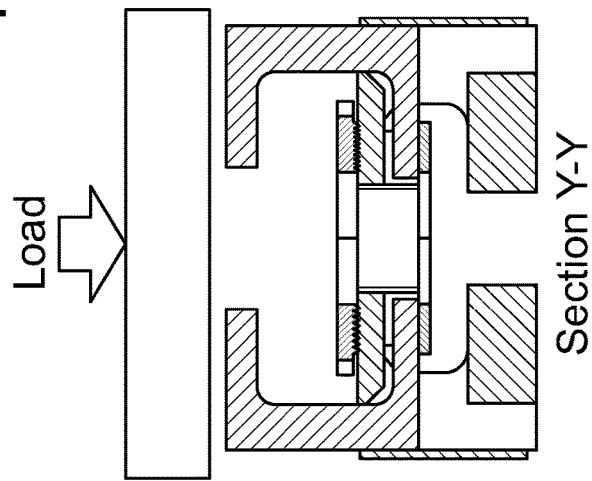
Figure 4A:
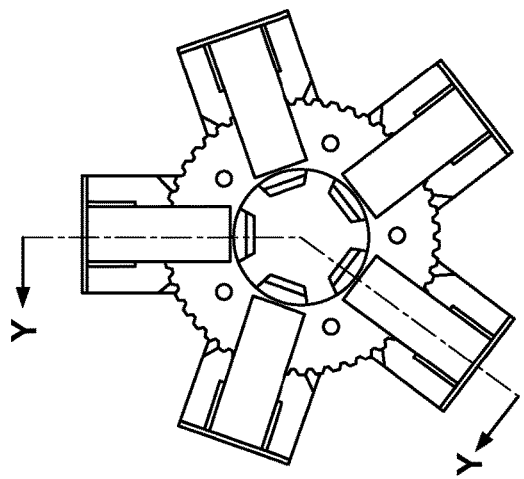
Figure 4B:
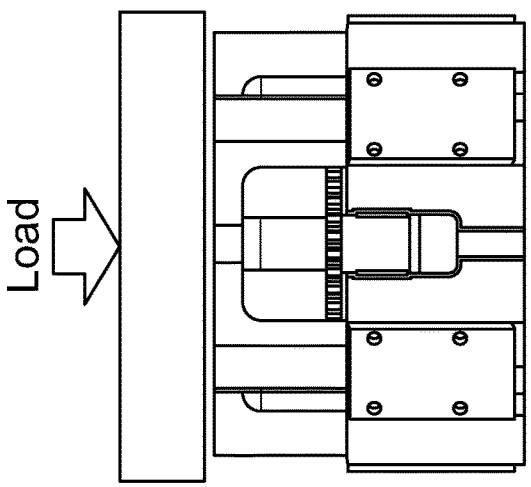

After the spider 10 and flange 12 are heated, the pellets 26 may melt and alloy with the metals of the spider 10 and flange 12, resulting in a brazed joint 30 between the spider 10 and the flange 12. The final braze part 30 is shown in FIG. 2A. FIG. 2B shows a 7× magnified view of the brazed joint 30. FIG. 2C shows a 10× magnified view of the brazed joint 30. FIG. 2D shows a 50× magnified view of the brazed joint 30.

The brazed joint may have an improved strength as compared to brazed joints that did not utilize presintered braze pellets. As shown in Table 1 below, the average of break for "Green Pill," i.e., brazed joints made with non-presintered pellets has a lower average of break (kN) than brazed joints made with presintered pellets. The breaking strength is a tensile force applied in a way that creates a separation of the assembly either by fracture of one of the base metals or by fracture of the braze joint itself. Such tests may be conducted with pure tension test or may be conducted by applying a torque test such as show in FIGS. 3A-3B and 4A-4D.

TABLE 1

Average of Break for Presintered and Non-Presintered Brazed Joints

| Sample | Average of Break (kN) |
|---|---|
| Control (Non-Presintered) Sample A Normal Condition, 12% $H_2$, No Lube, No Flux in Braze Alloy, Molded at 6.9 g/cc | 29421 |
| Presintered Sample B | 55569 |
| Presintered Sample C | 57427 |
| Presintered Sample D | 60288 |
| Presintered Sample E | 58743 |

Samples B, C, and D were delubed in air and brazed in $H_2$—$N_2$. Sample E was delubed in nitrogen and brazed in $H_2$—$N_2$. The average of the metallurgic joints using the presintered samples (Samples B, C, and D) has an average break of 57761 kN as compared to the 29421 kN average break of the control, a value nearly twice as large. Accordingly, presintering of the braze pellets 26 increases the average break and therefore the strength of the braze product. In an embodiment, the average break strength of the metallurgic joints using the presintered samples may be greater than 35000 kN. In an embodiment, the average break strength of the metallurgic joints using the presintered samples may be greater than 45000 kN. In an embodiment, the average break strength of the metallurgic joints using the presintered samples may be greater than 55000 kN. In an embodiment, the average break strength of the metallurgic joints using the presintered samples may be greater than 60000 kN.

While the example above is for a flange and spider configured to join together to form a carrier part, the technology may be used for any appropriate components. For example, the technology is useful in the automotive industry to form components that need to be strong as they face high stress situtations. In an embodiment, the technology may be used for engine components and/or transmission components. The technology may also be utilized in other fields outside of the automotive industry, e.g., aerospace, manufacturing, construction, etc.

Although the embodiments of the present application have been illustrated in the accompanying drawings and described in the foregoing detailed description, it is to be understood that the present application is not to be limited to just the embodiments disclosed, but that the application described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. An article comprising a first metal component adjoined to a second metal component by a metallurgic joint of presintered metal pellet interposed between contiguous surfaces of the first metal component and the second metal component,
wherein the presintered metal pellet comprises a mechanically compacted powdered metal, and
wherein the article comprises a carrier part, the first metal component comprises a spider of the carrier part and the second metal component comprises a flange of the carrier part.

2. The article of claim 1, wherein the powdered metal is selected from a group consisting of iron, carbon, copper, nickel, molybdenum, chromium, manganese, or a combination of two of more thereof.

3. The article of claim 2, wherein the powdered metal is manufactured by a copper infiltration process.

4. The article of claim 2, wherein the powdered metal was presintered in an atmosphere selected from a group consisting of air, hydrogen, nitrogen, helium, methane, endogas, or a combination of two or more thereof.

5. The article of claim 4, wherein the powdered metal was presintered at a temperature of about 300° F.-1500° F.

6. The article of claim 5, wherein the powdered metal comprises no lubricants.

7. The article of claim 6, wherein the powdered metal comprises no fluxing agents.

8. The article of claim 7, wherein the metallurgic joint is formed by a brazing process.

9. The article of claim 8, wherein the brazing process occurs in a $H_2$—$N_2$ atmosphere.

10. The article of claim 9, wherein break strength of the metallurgic joint is at least 35000 kN.

11. The article of claim 9, wherein break strength of the metallurgic joint is at least 45000 kN.

12. The article of claim 9, wherein break strength of the metallurgic joint is at least 55000 kN.

13. A composition for use in a brazing process comprising a presintered powdered metal, wherein the presintered powdered metal is selected from a group consisting of iron, carbon, copper, nickel, molybdenum, chromium, manganese, or a combination of two of more thereof,
wherein the powdered metal is manufactured by a copper infiltration process,
wherein the powdered metal is presintered in an atmosphere selected from a group consisting of air, hydrogen, nitrogen, helium, methane, endogas, or a combination of two or more thereof,
wherein the powdered metal is presintered at a temperature of about 300° F.-1500° F.,
wherein the powdered metal comprises amide waxes, metallic stearates, lubricants, and fluxing agents,
wherein the lubricants and the fluxing agents are dissipated by presintering.

14. The composition of claim 13, wherein the powdered metal is presintered at a temperature of 300° F.-1500° F.

15. The composition of claim 14, wherein the powdered metal is presintered in an atmosphere selected from a group consisting of air, hydrogen, nitrogen, helium, methane, endogas, or a combination of two or more thereof.

16. A process for brazing comprising:
compacting a powdered metal into a pellet;
presintering the pellet;
adding the presintered pellet to a first and second metal component;
heating the combination of the first and second metal components containing the presintered pellet until the pellet melts and joins the metal components to form a metallurgic joint.

* * * * *